(12) United States Patent
Clark et al.

(10) Patent No.: US 8,843,906 B1
(45) Date of Patent: Sep. 23, 2014

(54) INFERRING DATA TYPES FROM COMPILER CALL SITE

(75) Inventors: Martin Clark, Boston, MA (US); Frederick Mattsson Smith, Natick, MA (US); John Elliott, Natick, MA (US); Ricardo Losada, Marlborough, MA (US)

(73) Assignee: The MathWorks, Inc., Natick, MA (US)

( * ) Notice: Subject to any disclaimer, the term of this patent is extended or adjusted under 35 U.S.C. 154(b) by 1594 days.

(21) Appl. No.: 11/581,965

(22) Filed: Oct. 16, 2006

(51) Int. Cl.
*G06F 9/45* (2006.01)

(52) U.S. Cl.
USPC ............ 717/143; 717/140; 717/151; 717/154

(58) Field of Classification Search
CPC combination set(s) only.
See application file for complete search history.

(56) References Cited

U.S. PATENT DOCUMENTS

| | | | | |
|---|---|---|---|---|
| 4,686,623 A * | 8/1987 | Wallace | ........................ | 717/143 |
| 5,247,668 A * | 9/1993 | Smith et al. | ..................... | 717/154 |
| 6,378,126 B2 * | 4/2002 | Tang | .............................. | 717/143 |
| 6,412,107 B1 * | 6/2002 | Cyran et al. | ..................... | 717/151 |
| 6,456,308 B1 * | 9/2002 | Agranat et al. | ................ | 715/854 |
| 6,629,313 B1 * | 9/2003 | Rowe et al. | ..................... | 717/136 |
| 6,654,953 B1 * | 11/2003 | Beaumont et al. | ............. | 717/143 |
| 6,665,865 B1 * | 12/2003 | Ruf | ................................ | 717/151 |
| 6,813,761 B1 * | 11/2004 | Das et al. | ........................ | 717/154 |
| 7,055,143 B2 * | 5/2006 | Ringseth et al. | .............. | 717/143 |
| 7,062,761 B2 * | 6/2006 | Slavin et al. | .................... | 717/151 |
| 7,100,153 B1 * | 8/2006 | Ringseth et al. | .............. | 717/140 |
| 7,150,010 B1 * | 12/2006 | Ringseth et al. | .............. | 717/140 |
| 7,426,721 B1 * | 9/2008 | Saulpaugh et al. | ........... | 717/143 |
| 7,500,232 B2 * | 3/2009 | Das et al. | ....................... | 717/154 |
| 7,539,982 B2 * | 5/2009 | Stuart | ............................ | 717/140 |
| 7,584,461 B2 * | 9/2009 | Plum | .............................. | 717/143 |
| 7,703,085 B2 * | 4/2010 | Poznanovic et al. | .......... | 717/140 |
| 7,725,884 B2 * | 5/2010 | Ramani et al. | ................. | 717/143 |
| 7,810,080 B2 * | 10/2010 | Plum et al. | ..................... | 717/143 |
| 7,992,140 B2 * | 8/2011 | Meijer et al. | .................. | 717/140 |
| 8,161,464 B2 * | 4/2012 | Archambault et al. | ........ | 717/151 |
| 8,458,678 B2 * | 6/2013 | Meijer et al. | .................. | 717/140 |
| 8,601,456 B2 * | 12/2013 | Duffy et al. | .................... | 717/143 |
| 8,612,948 B2 * | 12/2013 | Kawachiya et al. | ........... | 717/140 |
| 8,656,379 B2 * | 2/2014 | Meirowitz et al. | ............. | 717/153 |
| 8,667,474 B2 * | 3/2014 | Radigan | ........................ | 717/143 |
| 2004/0068719 A1 * | 4/2004 | Liu et al. | ........................ | 717/154 |
| 2004/0088685 A1 * | 5/2004 | Poznanovic et al. | .......... | 717/140 |
| 2004/0088689 A1 * | 5/2004 | Hammes | ........................ | 717/154 |

(Continued)

OTHER PUBLICATIONS

Josephine Micallef; Encapsulation, Reusability and Extensibility in Object-Oriented Programming Languages; Department of Computer Science of Columbia University; Aug. 1987; retrieved online on Mar. 19, 2014; pp. 1-71; Retrieved from the Internet: <URL: academic-commons.columbia.edut/download/.../cucs-285-87.pdf>.*

(Continued)

*Primary Examiner* — Thuy Dao
*Assistant Examiner* — Hanh T Bui
(74) *Attorney, Agent, or Firm* — Nelson Mullins Riley & Scarborough LLP (57) ABSTRACT

Disclosed herein are methods and compilers for compiling code. The methods and compilers disclosed can compile a callable compilable unit of code free of declarations and assertions that identify attributes of arguments expressed therein. The attributes of the arguments in the callable compilable unit of code are inferred by the compilers and methods disclosed herein from information provided by a call site that calls a compiler to compile the callable compilable unit of code.

26 Claims, 5 Drawing Sheets

(56) References Cited

U.S. PATENT DOCUMENTS

| | | | |
|---|---|---|---|
| 2004/0133886 A1* | 7/2004 | Wu | 717/154 |
| 2004/0177349 A1* | 9/2004 | Black-Ziegelbein et al. | 717/140 |
| 2005/0010899 A1* | 1/2005 | Kung et al. | 717/108 |
| 2005/0097535 A1* | 5/2005 | Plum | 717/151 |
| 2005/0108694 A1* | 5/2005 | Ramani et al. | 717/143 |
| 2006/0004827 A1* | 1/2006 | Stuart | 707/102 |
| 2006/0005175 A1* | 1/2006 | Ringseth et al. | 717/143 |
| 2006/0041872 A1* | 2/2006 | Poznanovic et al. | 717/140 |
| 2006/0095897 A1* | 5/2006 | Kawai et al. | 717/140 |
| 2007/0028223 A1* | 2/2007 | Meijer et al. | 717/140 |
| 2007/0044080 A1* | 2/2007 | Vick et al. | 717/143 |
| 2007/0174824 A1* | 7/2007 | Relyea et al. | 717/140 |
| 2007/0240137 A1* | 10/2007 | Archambault et al. | 717/140 |
| 2009/0106745 A1* | 4/2009 | Archambault et al. | 717/154 |
| 2009/0328013 A1* | 12/2009 | Aharoni et al. | 717/140 |
| 2010/0042982 A1* | 2/2010 | Aharoni et al. | 717/151 |
| 2010/0218174 A1* | 8/2010 | Schneider | 717/140 |

OTHER PUBLICATIONS

Emmanuel Muller et al.; Ranking Outlier Nodes in Subspaces of Attributed Graphs; University of Antwerp, Belgium; IEEE; 2013; retrieved online on Mar. 18, 2014; pp. 216-222; Retrieved from the Internet: <URL: http://ieeexplore.ieee.org/stamp/stamp.jsp?tp=&arnumber=6547453>.*

Toheed Aslam et al.; AspectMatlab: An Aspect-Oriented Scientific Programming Language; ACM; 2010; retrieved online on Mar. 18, 2014; pp. 181-192; Retrieved from the Internet: <URL: http://delivery.acm.org/10.1145/1740000/1739252/p181-aslam.pdf?>.*

\* cited by examiner

400 → function y = myfunction(x1, x2)
y = x1 + x2;

*Fig. 4*

Class 'myfunction', a1, a2 a1 = attrib('double', 'real', [10 1]);
a2 = attrib('double', 'complex', [1 1]);
mycompiler('myfunction', a1, a2)

*Fig. 5*

600 → mycompiler('myfunction', attrib(x1), attrib(x2))

*Fig. 6*

```
a1 = attrib(x1);
a1.DynamicSize = true;
mycompiler('myfunction', a1, x2);
```

*Fig. 7*

INFERRING DATA TYPES FROM COMPILER CALL SITE

BACKGROUND

A compiler is a computer program or set of programs that translates one computer language (i.e., source code) into another computer language (i.e., object code or target language). Commonly, the output of the compiler has a form suitable for processing by other programs (e.g., a linker), but it may be a human readable text file.

Computer languages often contain constructs that take inputs and perform some computation based on those inputs. A common example of such a construct is a function. The type of inputs to a function is usually constrained by the language or the environment in which it is run. For example, some functions may work with scalar and matrix inputs while other functions may only work with scalar inputs.

As such, the compiler needs to know the attributes of each function argument (e.g., data type, array size, and the like) in order to compile the source code into the target language. Conventionally, declarations or assertions in the source code are used to identify the attributes of the function arguments in the source code. In this manner, by parsing the source code the compiler is able to identify the attributes of each function argument in the source code. In turn, the compiler outputs the target language.

A conventional compiler and a conventional methodology of compiling code often rely on the source code to provide the attributes of each function argument in the source code. That is, declarations and assertions in the source code determine and provide the conventional compiler with the attributes of each function argument. The source code is often partitioned, for example, into an interface and an algorithmic part. For C code, the algorithms are often specified in a .c file, whereas the interface information is often specified in an include, a .h, file. Such a collection of files is often referred to as source code. In other words, the mechanism calling the conventional compiler to compile source code into a target language does not determine the attributes of one or more function arguments expressed in the source code, rather, the source code does for the conventional compiler.

SUMMARY OF INVENTION

Exemplary embodiments described herein provide compilers and methods of compiling source code that allow a compiler to determine the attributes of an argument of a callable compilable unit of code from a request or call to the compiler. That is, a compiler can infer an attribute of the argument from information passed into the compiler by a call to the compiler. Thus, the callable compilable unit of code can be free of declarations and assertions that would provide the compiler with attribute information of an argument expressed in the callable compilable unit of code expressed in the source code. In other words, the site of the call to the compiler identifies the attributes of the argument and not the source code.

A compiler as disclosed herein can infer attributes of a callable compilable unit of code from examples, assertions, objects and the like that are passed into the compiler from a call site, such as a Command Line Interface (CLI) or a call from an operating system or a call from code in a programming environment. This allows the compiler to compile a polymorphic function expressed in a source code and output a reduced polymorphic function expressed in the target language. The polymorphic function, by definition, includes at least one dynamically typed argument. After compilation, using the supplied information, at least one dynamic attribute of the at least one dynamically typed argument becomes a static attribute. That is, the function in the target code has reduced polymorphism relative to the source function. For example, the function with the reduced polymorphism can include at least one hybrid typed argument that has a static data type and a vector size that remains variable at run time.

As used herein, a callable compilable unit of code is considered polymorphic in attribute if it accepts inputs with different values of that attribute. Some example attributes include size (number of elements in an array), type (what does the input represent), and complexity (is the input complex or not). Nonetheless, an attribute can include any aspect of the input including its value. When the source language is polymorphic in an attribute, exemplary embodiments described herein disclose compiler methods that allow a user to constrain the attribute possibilities so that more efficient target code is generated.

The portability of source code between different programming environments can be improved by allowing the source code to be free of declarations and assertions identifying attributes of a callable compilable unit of code.

In one embodiment, a method of compiling code is disclosed. The method includes the steps of defining a callable compilable unit of code in source code and passing information about an attribute of an argument into a compiler from outside of the callable compilable unit of code. That is, the source code is free of the information about the attribute passed into the compiler. In turn, at compile time the compiler infers the attribute of the argument in the callable compilable unit of code from the passed information and compiles the unit of code into a target language.

The method can include other steps including the step of compiling the callable compilable unit of code into the target language.

Another step that the method can include is the step of instructing the compiler to handle the argument as a constant. As such, after compiling the callable compilable unit of code, the target language is free of an argument corresponding to the argument in the callable compilable unit of code that was handled as a constant. Additionally, the method can include the step of passing one or more parameters to the compiler to identify a value of the constant.

The method can include the steps of defining an attribute class for the argument and instantiating an object of the attribute class. In turn, the method can include the step of passing the object to the compiler to provide the compiler with one or more properties of the argument.

In this embodiment, the callable compilable unit of code is free of any of declarations or assertions representative of the attribute of the argument.

The method can include the step of instructing the compiler to handle the argument as a dynamically sized argument.

The compiler performing the method can infer the attribute of the argument from the information passed into the compiler.

The information about the attribute of the argument includes a representation of the attribute of the argument. The information about the attribute of the argument includes an instance of an object identifying the attribute of the argument. The information about the attribute of the argument includes an assertion. The information about the attribute of the argument includes an attribute representative of the datatype of the argument.

In another embodiment, a computer readable medium holding computer executable instructions for performing a method of compiling code is disclosed. The instructions embodied on the medium include, calling a compiler to pass information representative of an attribute of an argument expressed in a callable compilable unit of code into the compiler and passing the information to the compiler. That is, the callable compilable unit of code and the source code is free of the information about the attribute passed into the compiler. In turn, the compiler infers the attributes of the argument from the passed information and can compile the callable compilable unit of code into a target language.

The computer readable medium can include the instructions for compiling the callable compilable unit of code into the target language. Additionally, the computer readable medium can include the instructions for instructing the compiler to handle the argument as a constant. As such, after compiling the callable compilable unit of code, the target language is free of an argument corresponding to the function argument in the callable compilable unit of code handled as a constant. The computer readable medium can include the instructions for passing one or more parameters to the compiler to identify a value of the constant.

Further, the computer readable medium can include the instructions for instructing the compiler to get the argument from an object of an attribute class. The computer readable medium can include the instruction of instantiating an object of the attribute class. The computer readable medium can include the instruction for passing the object to the compiler to provide the compiler with one or more properties of the argument.

In one aspect, the source code is free of any of declarations or assertions representative of the attribute of the argument.

The computer readable medium can include the instructions for instructing the compiler to handle the argument as a dynamically sized argument.

The compiler infers the attribute of the argument from the information passed into the compiler.

The information about the attribute of the argument includes a representation of the attribute of the argument. The information about the attribute of the argument includes, an instance of an object identifying the attribute of the argument. The information about the attribute of the argument includes an assertion. The information about the attribute of the argument includes, an attribute representative of the datatype of the argument.

In one embodiment, a method of compiling callable compilable unit of code is disclosed. The method includes the steps of, parsing a polymorphic function written in a callable compilable unit of code and compiling the callable compilable unit of code to translate the polymorphic function into a reduced polymorphic function in a target language. The polymorphic function has one or more arguments that are dynamically typed, however, the reduced polymorphic function has at least one argument that includes one or more properties of a static attribute and one or more properties of a dynamic attribute.

The method can include the steps of calling the compiler and passing to the compiler an example of each of the one or more arguments. The compiler infers the attribute for the argument from the example.

The method can include the steps of calling the compiler and passing to the compiler an assertion specifying a condition for at least one of the arguments. The compiler infers the attributes of the argument from the assertion.

The method can include the steps of calling the compiler and passing to the compiler an instance of an object identifying attributes of the one or more arguments. The compiler determines that attributes of the arguments from the object.

The method can include the step of compiling two or more versions of the target language. The compiler compiles the two or more versions of the target language based on different attributes of the one or more arguments.

In one embodiment, a computer readable medium holding computer readable instructions that when executed cause a compiler to compile a callable compilable unit of code is disclosed. The instructions include parsing a polymorphic function written in a callable compilable unit of code and compiling the callable compilable unit of code to translate the polymorphic function into a reduced polymorphic function in a target language. The polymorphic function has at lease one dynamically typed argument and the reduced polymorphic function has a hybrid typed argument with an attribute that becomes static and an attribute that remains dynamic. For example, the hybrid typed argument can have a static data type and a vector size that remains variable at run time.

The medium can include the instructions for calling the compiler and passing to the compiler an example of the argument. The compiler infers the attributes for the argument from the example.

The medium can include the instructions for calling the compiler and passing to the compiler an assertion specifying a condition for the argument. The compiler infers the attributes of the argument from the assertion.

The medium can include the instructions for calling the compiler and passing to the compiler an instance of an object identifying attributes of the argument. The compiler infers the attributes of the argument from the object.

The medium can include instructions for compiling two or more versions of the target language. The compiler compiles the two or more versions of the target language based on different attributes of the argument.

In one embodiment, a computing device for use in compiling code is disclosed. The computing device includes a storage device holding a callable compilable unit of code expressed in source code and a compiler accepting as input the callable compilable unit of code and information from outside of the callable compilable unit of code and the source code identifying an attribute of an argument expressed in the callable compilable unit of code and generating as output, a target language. The computing device can include an interface responsive to input from a user to call the compiler and input the information identifying the attribute of the argument in the callable compilable unit of code. The computing device can include a display device for use in displaying any of, the interface, the callable compilable unit of code or the target language. The computing device can include an input device for use by the user to provide the input to the user interface.

The callable compilable unit of code can be one of a text based code or a graphical model based code.

The target language can be one of a text based target language or a graphical model based target language.

BRIEF DESCRIPTION OF DRAWINGS

An illustrative embodiment of the present invention will be described below relative to the following drawings.

DETAILED DESCRIPTION

The illustrative embodiments described herein provide compilers and methods of compiling a unit of code. The compilers and methods thereof improve portability of code between different programming environments by allowing a mechanism calling the compiler (i.e., compiler call site) to determine attributes of arguments expressed in the unit of code. This avoids the need to include declarations and assertions in the unit of code to determine and provide a compiler with the attributes of the arguments expressed in the unit of code.

The compilers and methods of compiling a unit of code disclosed herein allow a compiler to infer attributes of arguments expressed in the unit of code from examples, objects, assertions and the like that are passed to the compiler as part of the compiler call. That is, the unit of code is substantially free of information, for example, declarations, assertions and the like, that identify one or more of the attributes of an argument expressed in the unit of code. In turn, the compiler infers the attribute information of the arguments from the information passed in to the compiler. The compiler call site making the compiler call can be an operating system (OS), a user interface, a function, executable code and the like.

The compilers and methods of compiling a unit of code disclosed herein can translate a polymorphic function expressed in a unit of code into a hybrid or reduced polymorphic function in the target language. That is, the polymorphic function can have a dynamically typed argument, while after compilation into the reduced polymorphic function in the target language the function can have an argument with at least one static attribute and one dynamic attribute. For example, after compilation of the polymorphic function, the data type of the argument of the reduced polymorphic function becomes static while the vector size of the argument remains variable.

Before continuing below with the detailed discussion it is helpful to define a few terms as used herein.

As used herein, the term "unit of code" or the term "callable compilable unit of code" refers to a function, a method, a procedure, a module, a program, a sub-routine, a class constructor and the like.

Figure 1:
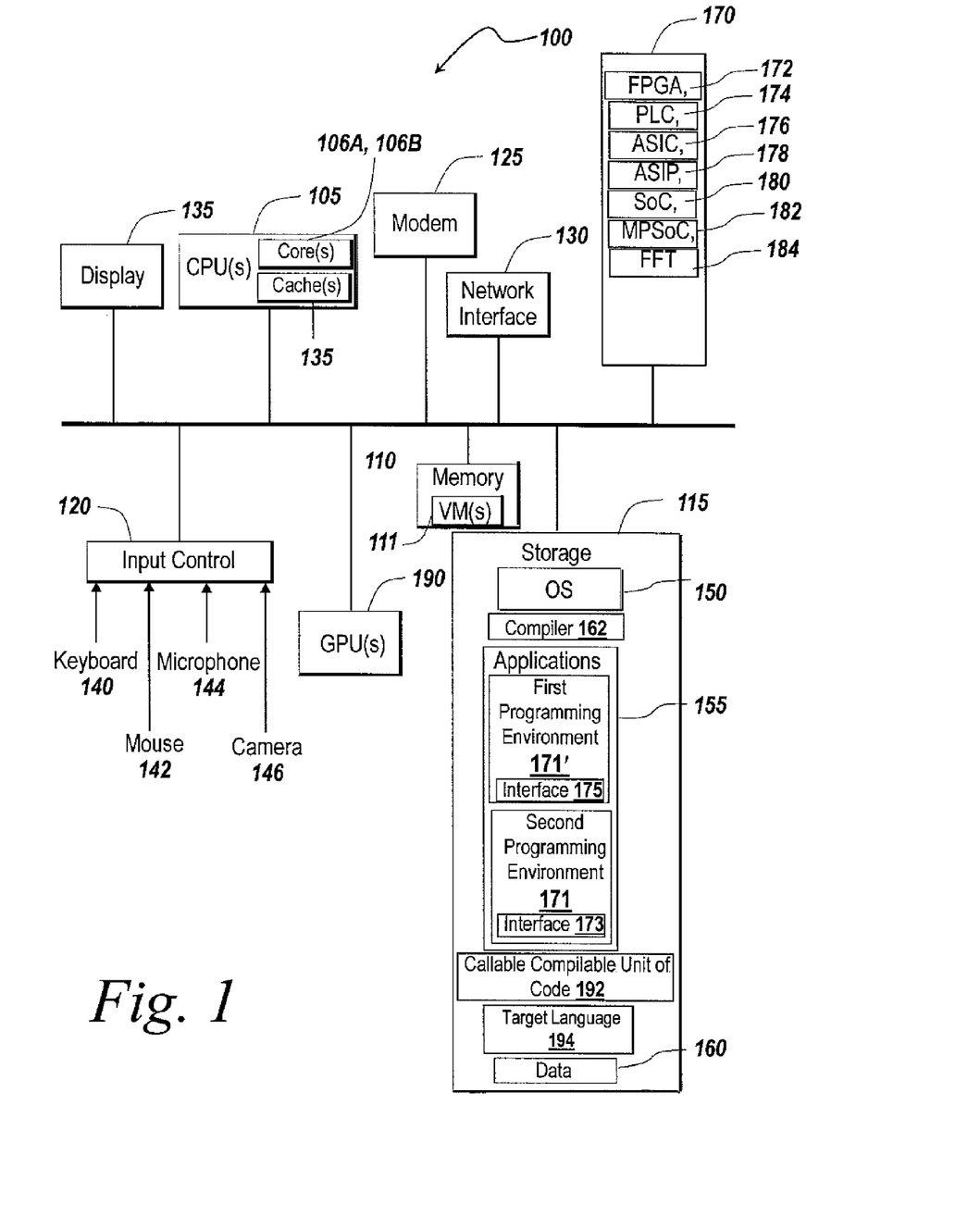
FIG. 1 is an exemplary computing device suitable for practicing an illustrative embodiment.

FIG. 1 is an exemplary computing device 100 suitable for use in compiling code. One of ordinary skill in the art will appreciate that the computing device 100 is intended to be illustrative and not limiting of the embodiments described herein. The computing device 100 may take many forms, including but not limited to a personal computer, workstation, server, network computer, quantum computer, optical computer, bio computer, Internet appliance, mobile device, a pager, a tablet computer, and the like.

The computing device 100 may be electronic and include a Central Processing Unit (CPU) 105, memory 110, storage 115, an input control 120, a modem 125, a network interface 130, a display 135, etc. The CPU 105 controls each component of the computing device 100 to provide the applications. The memory 110 temporarily stores instructions and data and provides them to the CPU 105 so that the CPU 105 operates the computing device 100 and runs the applications available to the computing device 100.

The computing device 100 may include multiple CPUs for executing software loaded in the memory 110, and other programs for controlling system hardware. Each of the CPUs can be a single or a multiple core processor 106A and 106B. The code loaded in the memory 110 may run in a virtualized environment, such as in a Virtual Machine (VM) 111. Multiple VMs may be resident on a single processor. Also, part of the application could be run in hardware 170, for example, by configuring a field programmable gate array (FPGA) 172, a programmable logic controller (PLC) 174 or creating an application specific integrated circuit (ASIC) 176, an application specific instruction-set processor (ASIP) 178, a system-on-chip (SoC) 180, a multiple-processor system on chip (MPSoC) 182, etc. Further, the part of the applications may be run on analog electronic devices or other resources may be used to run part of the application, such as graphics processing units (GPUs) 190 or dedicated hardware such as Fast Fourier Transform (FFT) processing blocks 184.

The storage 115 may contain software tools for applications. Such an application may be a software system, such as a software document processing application (e.g., MS Word®, MS PowerPoint®, MS Excel®, etc.) or a software technical computing application (e.g., Simulink® or MATLAB® modeling environments). The storage 115 can include code 150 for the operating system (OS) of the device 100, code 155 for applications running on the operating system, code for a compiler 162, callable compilable unit of code 192 developed using any of code 155 and a target language 194 output from a compiler 162.

The compiler 162 accepts as input the callable compilable unit of code 192 and information from outside of the callable compilable unit of code 192 representative of attributes of arguments expressed in the callable compilable unit of code 192. In turn, the compiler 162 determines the attributes of the arguments expressed in the callable compilable unit of code 192 from the information representative thereof and outputs the target language 194. In this manner, the callable compilable unit of code 192 can be free of declarations or assertions that identify the attributes of the arguments expressed in the callable compilable unit of code 192. The information from outside of the callable compilable unit of code 192 representative of attributes of arguments expressed in the callable compilable unit of code 192 can include, but is not limited to examples, assertions, objects and commands.

One application executable by the computing system 100 includes a first programming environment 171' such as a graphical modeling environment like SIMULINK® modeling environment from The MathWorks, Inc. of Natick, Mass. SIMULINK® modeling environment provides a graphical and interactive environment by which engineers and other designers can use a model based design approach to design and develop code. With a model based design approach, the first programming environment 170 allows a block diagram model to be an implementation specification for generating code.

The applications 155 can include a second programming environment 171 such as MATLAB® modeling environment from The MathWorks, Inc. of Natick, Mass. MATLAB® modeling environment provides an intuitive language and a technical computing environment that enables the development of code. The MATLAB® modeling environment integrates mathematical computing, visualization, and a technical language. MATLAB® modeling environment provides core mathematics and advanced graphical tools for data analysis, visualization, and algorithm and application development. MATLAB® modeling environment further provides a range of computing tasks in engineering and science, from data acquisition and analysis to application development. Built-in interfaces of MATLAB® modeling environment enable users to access and import data from instruments, files, and external databases and programs. In addition, MATLAB® modeling environment enables the users to integrate external routines written in C, C++, FORTRAN, and Java with the MATLAB® modeling environment applications.

Those skilled in the art will appreciate that other applications can be held by the storage 115, for example, a document processing application. The storage 115 may also store data sets 160 that can be loaded by the applications. The data sets 160 can be, for example, a serialization artifact, such as a file. Those of ordinary skill in the art will appreciate that parts of the applications can be stored in the CPU cache 107 or memory 110 as well, much like the data sets, and even the OS 150, or they can be stored on the network described below with reference to FIG. 2.

The first programming environment 170 can include an interface 175. The interface 175 allows a user to interact with the first programming environment 170. Those skilled in the art will appreciate that the interface 175 can take the form of a graphical user interface that provides a user of the computing system 100 with textual and graphical information to allow the user to browse, select, create and modify code associated with first programming environment 170 and to interact with the compiler 162. Those skilled in the art will also appreciate that the interface 175 is also implementable as a command line interface or other suitable interface that allows a user to view and interact with the compiler 162.

The second programming environment 171 can include an interface 173. The interface 173 allows a user to interact with the second programming environment 171. Those skilled in the art will appreciate that the interface 173 can take the form of a graphical user interface that provides a user of the computing system 100 with textual and graphical information to allow the user to browse, select, create and modify code associated with second programming environment 171 and to interact with the compiler 162. Those skilled in the art will also appreciate that the interface 173 is also implementable as a command line interface or other suitable interface that allows a user to view and interact with the compiler 162.

The first programming environment 170 and the second programming environment 171 may support interprocess communications between each other through the use of an application programming interface, a function call, a method call, a procedure call, an object such as a Common Object Model object, a block such as an embedded MATLAB® modeling environment function block in SIMULINK® modeling environment or any combination thereof.

The embedded MATLAB® modeling environment function block in SIMULINK® modeling environment contains a MATLAB® modeling environment function in a SIMULINK® modeling environment model. The function can accept multiple input signals and can produce multiple output signals. The embedded MATLAB® modeling environment function block in SIMULINK® modeling environment can also call subfunctions, runtime library functions, and other MATLAB® modeling environment functions. Additionally, the embedded MATLAB® modeling environment function block in SIMULINK® modeling environment provides a structure, function and operation to generate executable code, such as C code or an HDL representation for embedded applications such as VHDL or Verilog.

As such, the embodiments described herein are well suited for use with an embedded MATLAB® modeling environment function block in SIMULINK® modeling environment. In this manner, a user of the computing device 100, the first programming environment 170 or the second programming environment 171 can call the compiler 162 with a compiler call from the interface 173, the interface 175, the OS 150 and the like to generate executable code corresponding to the functionality of the embedded MATLAB® modeling environment function block. As part of the compiler call or as part of instructions or information passed to the compiler 162 via the interface 173, the interface 175, the OS 150 subsequent to the compiler call, a user of the computing device 100, the first programming environment 170 or the second programming environment 171 can pass information representative of the attributes of the arguments expressed in the embedded MATLAB® modeling environment function block to the compiler 162. In turn, the compiler 162 determines the attributes of the function arguments expressed in the callable compilable unit of code 192 from the passed information and compiles the callable compilable unit of code 192 into a target language 194. Nonetheless, those skilled in the art will appreciate that the teachings described herein are applicable to compiling of callable compilable unit of code 192 from any programming environment. Examples of passing information representative of the attributes of the callable compilable unit of code arguments expressed in the callable compilable unit of code 192 to allow the compiler 162 to infer of determine the attributes of the arguments are discussed below.

The input control 120 may interface with a keyboard 140, a mouse 142, a micro phone 144, a camera 146 such as a web camera and/or other input devices including a neural interface. The neural interface accepts commands directly from the human or animal brain (or brain cell culture) without requiring physical movement and can be used to operate the computing device 100 or other devices. The computing device 100 may receive through the input control 120 input data, such as the input data for developing a model. The computing device 100 may display on the display 135 user interfaces for displaying the data generated from an application, such as a document processing application or a technical computing application.

Those skilled in the art will recognize that the illustrative concepts discussed herein are applicable to object oriented programming frameworks such as C++, as well as structured programming formats including C, FORTRAN and the like, or a hybrid programming framework such as C# having OO programming properties and structured programming properties, as well as domain specific languages (DSL).

Figure 2:
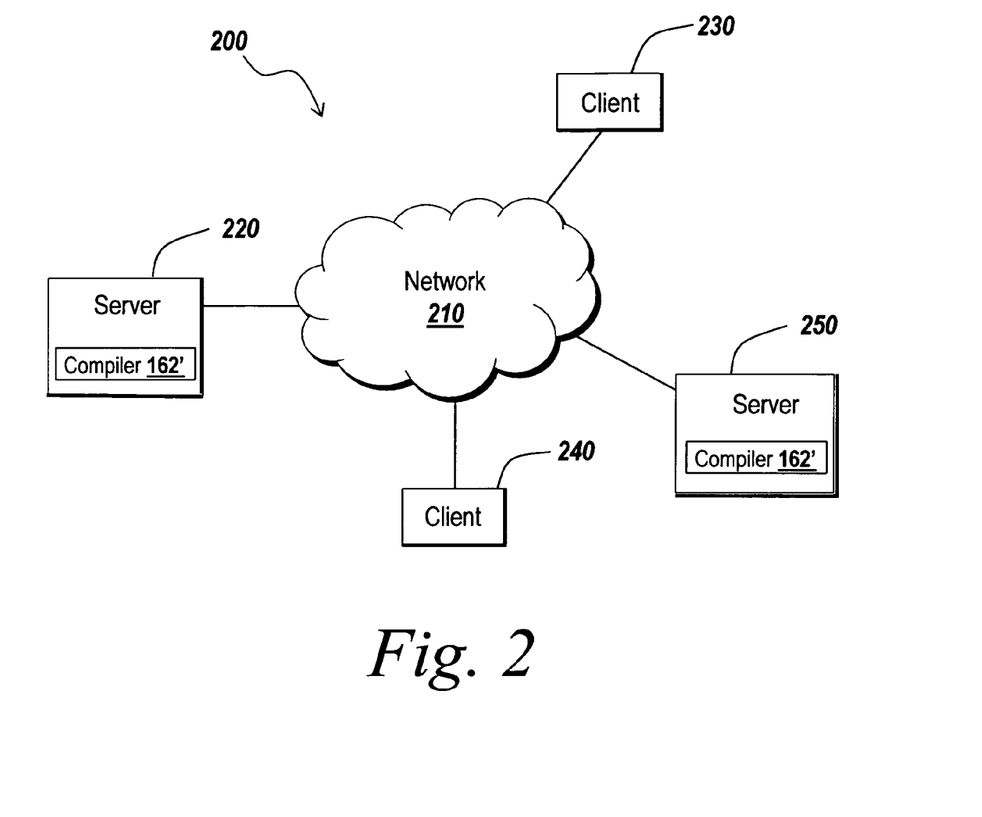
FIG. 2 depicts an exemplary distributed system suitable for a distributed implementation of the illustrative embodiment.

FIG. 2 is an exemplary network environment 200 suitable for the distributed implementation of the illustrative embodiment. The network environment 200 may include one or more servers 220 and 250 coupled to clients 230 and 240 via a communication network 210. In one embodiment, the clients 230 and 240 have the same structure, function and operation as the computing device 100. As such, the network interface 130 and the modem 125 of the computing device 100 enable the servers 220 and 250 to communicate with the clients 230 and 240 through the communication network 210. The communication network 210 may include the Internet, an intranet, a LAN (Local Area Network), a WAN (Wide Area Network), a MAN (Metropolitan Area Network), a wireless network (e.g., using IEEE 802.11 and Bluetooth), etc. In addition the network may use middleware, such as CORBA or DCOM to allow a computer on the network to communicate directly with another computer or device that is connected to the network. The communication facilities can support the distributed implementations of the embodiments taught herein including, but not limited to remote method invocation and remote procedure call.

In the network environment 200, the servers 220 and 250 may provide the clients 230 and 240 with software components or products under a particular condition, such as a license agreement. The software components or products may include those for providing the first programming environment 170, the second programming environment 171, or both. Additionally, the servers 220 and 250 can provide compiling services to the clients 230 and 240. In this embodiment, the servers 220 and 250 each hold and support a compiler 162' callable by the first programming environment 170, the second programming environment 171, or both. The compiler 162' accepts as input the callable compilable unit of code 192 and information from outside of the callable compilable unit of code 192 representative of attributes of function arguments expressed in the callable compilable unit of code 192. In turn, the compiler 162' determines the attributes of function arguments expressed in the callable compilable unit of code 192 from the information representative thereof and outputs the target language 194. In this manner, the callable compilable unit of code 192 can be free of declarations or assertions that identify the attributes of the function arguments expressed in the callable compilable unit of code 192. The information from outside of the callable compilable unit of code 192 representative of attributes of function arguments expressed in the callable compilable unit of code 192 can include, but is not limited to examples, assertions, objects and commands.

In one example, the client 240 may perform the modeling of a dynamic system using a software component provided by the server 220 and send the server 220 the model for simulation. The server 220 then returns the simulation results to the client 240 and the client 240 may subsequently display the data to the user with the information on the data.

Figure 3:
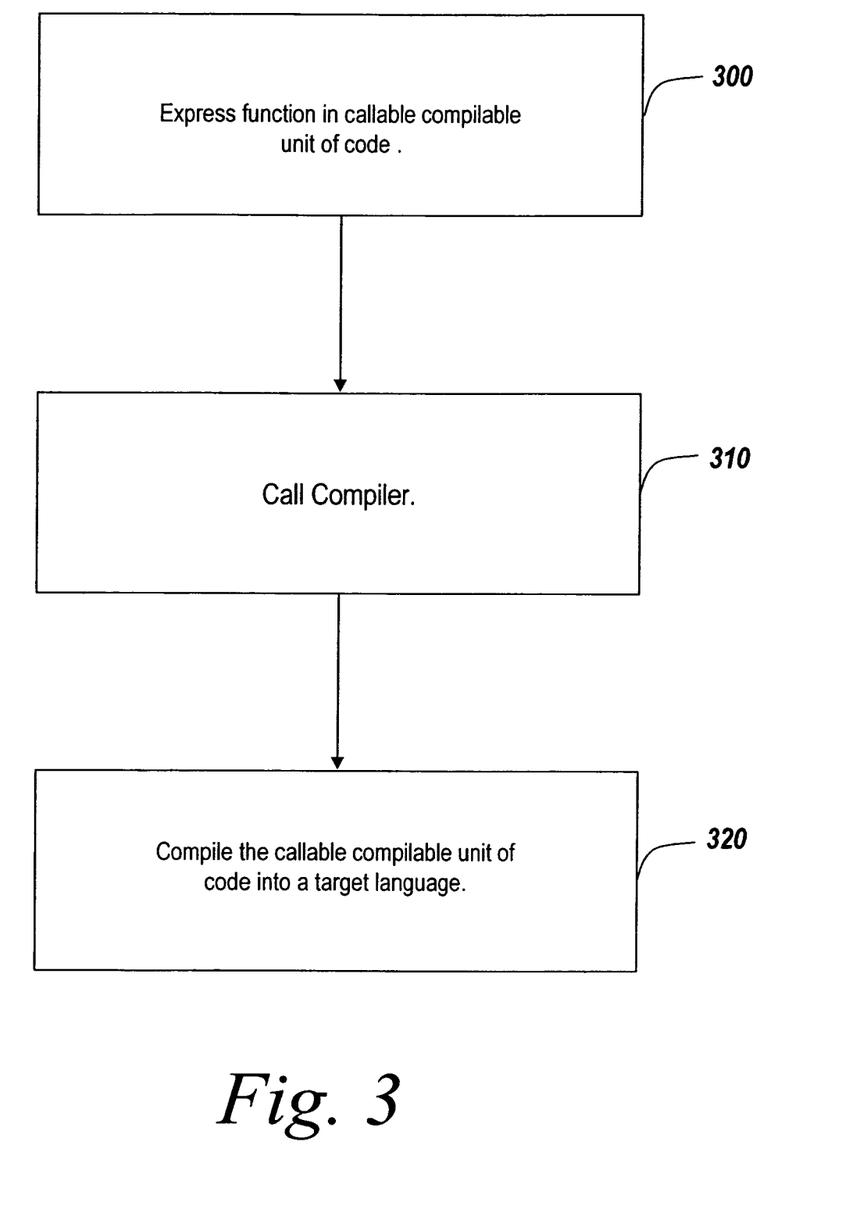
FIG. 3 is an exemplary flow chart that provides an overview of steps taken in the illustrative embodiment.

FIG. 3 depicts steps taken to practice an illustrative embodiment and is described in relation to FIGS. 1 and 2. The steps below illustrate the concepts disclosed herein on one example of a callable compilable unit of code, for example, a callable function, and is meant to facilitate explanation and not meant to be limiting to a particular type of a callable compilable unit of code. As such, the concepts described herein are equally applicable to other callable compilable units of code.

In step 300, a user of the computing device 100, for example, a programmer, an engineer or a scientist expresses a function in the callable compilable unit of code 192. The user can use the first programming environment 170, the second programming environment 171 or both to express the function in the callable compilable unit of code 192. As used herein, models developed in MATLAB® modeling environment, SIMULINK® modeling environment, or both are considered one type of a callable compilable unit of code suitable for use with the compiler 162. Further, as used herein the target language 194 can be any language different from the source code including, but not limited to C, C++, FORTRAN, HDL representation, C#, Python, Java, Basic and the like.

The function expressed in the callable compilable unit of code 192 has at least one function argument and the function argument has attributes such as, data type, complexity, array size, structure, double, integer, logical, character, cell, function handle, sample rate, and the like. In accordance with the teachings disclosed herein, the user of the computing device 100 expressing the function in the callable compilable unit of code 192 does not need to include a declaration, an assertion or both in the callable compilable unit of code 192 to identify the attributes of the function argument of the function expressed in the callable compilable unit of code 192. As will be discussed below in more detail, information representative of the attributes of the function argument is passed to the compiler 162 as part of a call to the compiler 162 to compile the callable compilable unit of code 192 into a target language 194 or passed subsequent to the call to the compiler 162.

In step 310, when the callable compilable unit of code 192 is ready for compiling, a call to the compiler 162 is initiated to translate the callable compilable unit of code 192 into the target language 194. The compiler call can be made by a call site such as the OS 150, the first programming environment 170, the second programming environment 171, any application 155, the user interface 173, the user interface 175, a function and the like. In this manner, the compiler call can be used to pass information representative of the attributes of the argument of the function expressed in the callable compilable unit of code 192. The information representative of the attributes of the function argument can include examples of an attribute of the function argument, an assertion that identifies the attributes of the function argument of the function, or an object that identifies the attributes of the function argument of the function. Those skilled in the art will appreciate that the information representative of the attributes of the function argument can be passed as part of the compiler call or passed to the compiler 162 subsequent to the compiler call or passed to the compiler 162 from the compiler call site prior to the call to compile the callable compilable unit of code 192.

In step 320, the compiler 162 compiles the callable compilable unit of code 192 into the target language 194 and in doing so determines the attributes of the function argument expressed in the callable compilable unit of code 192 from the information representative of the attributes of the function argument passed to the compiler 162.

In this manner, compiling the callable compilable unit of code 192 into the target language 194 using the compiler 162 or methods for compiling code as taught by the embodiments herein allows attributes of function arguments to be specified without requiring a user of the computing device 100 to modify their callable compilable unit of code 192, for example, their MATLAB® modeling environment function code or M-code. As such, the callable compilable unit of code 192 remains free of declarations or assertions used to identify the attributes of a function argument which, in turn, provides a number of benefits. In other words, the information provided by the compiler call site determines the attributes of the function argument of the function expressed in the callable compilable unit of code 192.

One benefit is the improved portability of the callable compilable unit of code 192 to different programming environments. Another benefit is the ability to build different versions of the callable compilable unit of code 192 with function arguments having different attributes according to the different versions without having to modify the callable compilable unit of code 192 for each different version. Moreover, if the user has generated code for testing a function in the callable compilable unit of code 192 (e.g., a test harness), it is likely that most if not all the information representative of the attributes of the function argument have been written and are reusable to provide call site examples for the compiler 162.

Figure 4:
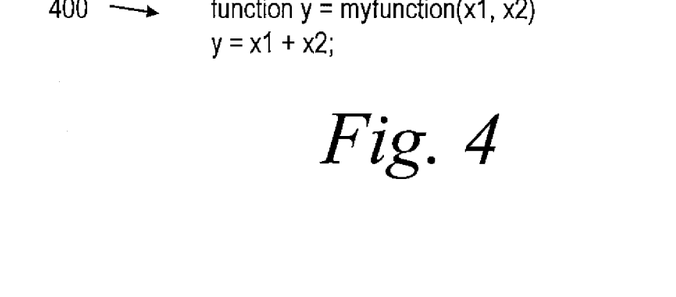
FIG. 4 is an exemplary function.

FIG. 4 illustrates an exemplary M-code function 400 expressible in the callable compilable unit of code 192. The exemplary M-code function 400 is discussed below as an example to facilitate explanation of how the compiler 162 infers the attributes of a function argument of a function expressed in the callable compilable unit of code 192. As discussed above, the compiler 162 infers the attributes of the function argument expressed in the callable compilable unit of code 192 from information representative of the attributes of the function argument passed from the compiler call site.

To translate the M-code function 400 into the target language 194, the compiler 162 needs to have the following information about function arguments x1 and x2. That is, the numeric datatype (e.g., single, double, int32); complexity (i.e., real or complex); and size (e.g., scalar, N×M matrix). In one embodiment examples of x1 and x2 are passed to the compiler 162 from the compiler call site, for example, the second programming environment 171. One illustrative example suitable for providing the compiler 162 with information representative of the attributes of x1 and x2 could be:

mycompiler 'myfunction'–{22.4, $f_i(2.3)$}

This example allows the compiler 162 to infer from the information representative of the attributes of x1 provided from the compiler call site that argument x1 is a double datatype, real and a 1×1 array. Likewise, from this example, the compiler 162 can infer from the information representative of the attributes of x2 provided from the compiler call site that argument x2 is a fixed point datatype, real and a 1×1 array.

Figure 5:
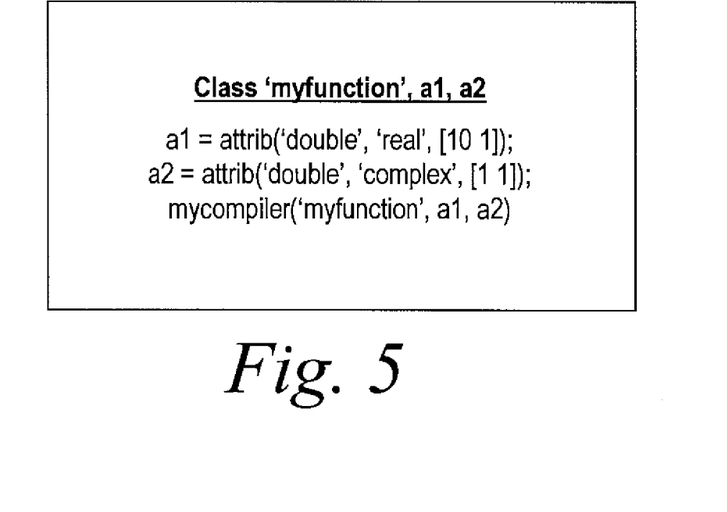
FIG. 5 is an exemplary class definition.

FIG. 5 illustrates one exemplary class definition defined to capture the attributes of x1 and x2 in the M-code function 400. In this embodiment, the user does not need to pass exemplary values to the compiler 162 from the compiler call site in order for the compiler 162 to infer or determine the attributes of x1 and x2. In this manner, an instance of an object of the exemplary class can be passed to the compiler to allow the compiler to determine the attributes of the arguments x1 and x2. Alternatively, a command or method can be passed to the compiler 162 that identifies to the compiler 162 a structure or location for use in inferring the attributes of the arguments x1 and x2.

Figure 6:
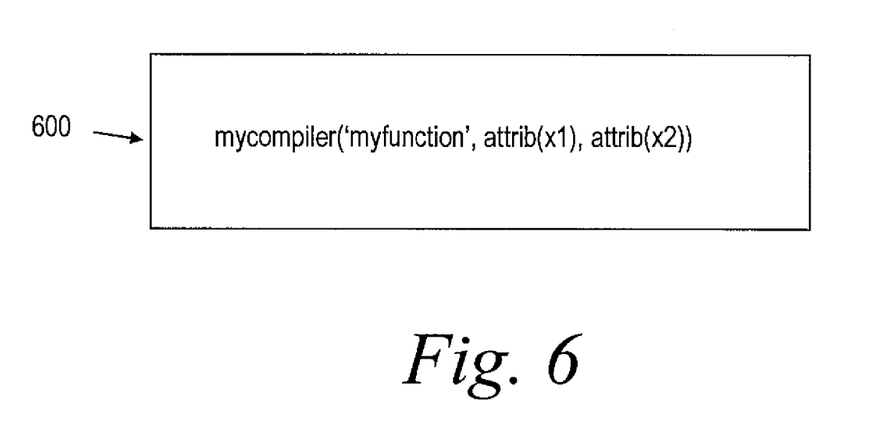
FIG. 6 is an exemplary object of the class definition illustrated in FIG. 5.

FIG. 6 illustrates an exemplary attribute object 600 expressed outside of the source code 192 and constructed from argument examples. The attribute object 600 is an instance of an object representing a class defining argument examples for x1 and x2. In turn, the compiler 162 infers the attributes of the arguments from the attribute object 600.

In accordance with the teachings described herein it is possible to have some function arguments expressed in the source code 192 assume constant values at compile time. Such arguments could have no corresponding function arguments in the target language 194. Moreover, it may be beneficial to instruct the compiler 162 to handle an argument as a dynamically-sized array at compile time. Dynamically-sized arguments would spawn at least one other argument in the target language 194 (i.e., the current size of the argument). Both of these features, constant-valued arguments and dynamically-sized arguments can be passed to the compiler 162 using a number of different methodologies. For example, by passing additional parameters to the compiler 162 from the compiler call site; defining corresponding properties in an attribute class; or a hybrid approach using additional parameters and defining corresponding properties in an attribute class.

Figure 7:
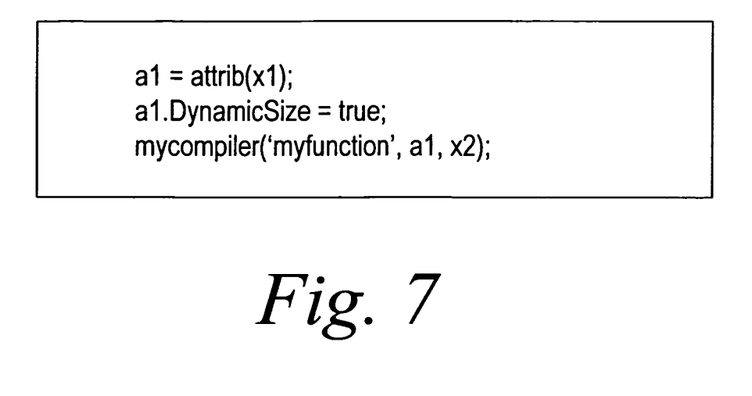
FIG. 7 is an exemplary representation of an assertion.

FIG. 7 illustrates an exemplary assertion suitable for passing information to the compiler 162 to translate a polymorphic function into a reduced polymorphic function in the target language 194. With this information representative of the attributes of the function arguments, the compiler 162 can infer that the first argument x1 of the function expressed in the callable compilable unit of code 192 is to be treated as a dynamically-sized array argument in the target language 194. The maximum size of this argument is given by the size of x1 at the compiler call site. Likewise, the compiler 162 can infer that the second argument x2 of the function expressed in the callable compilable unit of code 192 is to be treated as a constant (i.e., a scalar in this case) in the target language 194. The value of this argument is given by the value of x2 at the call site.

Accordingly, the compiler 162 can include a rule that allows the compiler 162 to infer the attributes of a function argument from information representative of the attributes passed to the compiler 162 from outside of the source code 192. For example, the rule could read: If the compiler argument is an attribute object, the corresponding function argument is a variable; otherwise, the function argument is a constant with attributes and value identical to that of the compiler argument.

The callable compilable unit of code 192 is written in a computer language that is compilable into the target language 194. Conversely, in another embodiment, the callable compilable unit of code 192 can include or be associated with code that does not result in corresponding target code in the target language 194 and is not considered to be part of the callable compilable unit of code as used herein.

For example, the callable compilable unit of code 192 can include or be the function "myfun(x)." The function "myfun(x)" can be wrapped in a function wrapper "function" and can be expressed in the callable compilable unit of code 192 as "function myfun(x)." As such, when the compiler 162 compiles the callable compilable unit of code 192 it produces target code only for the function "myfun(x)" and not the function wrapper. The compiler 162 handles the function wrapper as an additional input passed to it by a compiler call site and not part of the callable compilable unit of code 192.

The wrapper function is one example of the kind of code that may be used to pass information to the compiler 162. As described above, this information may include information about the parameter attributes or examples, from which such attributes may be inferred. In an alternative embodiment, the examples may be included in the same file and/or stream of code as the callable compilable unit of code 192 and may be passed to the compiler 162 at the same time and through the same channel as the callable compilable unit of code 192. In one alternative embodiment, the examples may be shown in comment sections of a file containing the callable compilable unit of code 192. In another alternative embodiment, the examples may be set out by specific syntax, as determined by one of skilled in the art.

While illustrative embodiments have been described herein, one skilled in the art will appreciate that changes in form and detail that may be made without departing from the intended scope of the present invention as defined in the pending claims. For example, the compiler of the present invention can translate a function with any number of arguments into a target language. Still further, the compiler 162 in addition to the functions and operations described above can perform any of the following operations: lexing; preprocessing; parsing; semantic analysis; code optimizations; and code generation.

What is claimed is:

1. A computer-implemented method of compiling code, the method comprising:
   defining a callable compilable unit of code in source code, the callable compilable unit of code having an argument as an input,
   passing information about an attribute of the argument to a compiler, wherein:
   the source code is free of the passed information, and
   the attribute is selected from a group consisting of a numeric data type, a complexity, and a number of dimensions, and
   the passing information comprises one of:
   passing an example of the argument to the compiler and inferring, using the compiler, at least one of the numeric data type of the argument, the complexity of the argument, or the number of dimensions of the argument from the example of the argument, or
   passing an object holding the information about the attribute of the argument to the compiler and retrieving, using the compiler, at least one of the numeric data type of the argument, the complexity of the argument, or the number of dimensions of the argument from the object; and calling the compiler to compile the callable compilable unit of code into a target language to produce target language code, the target language code interpreting the argument using the numeric data type of the argument, the complexity of the argument, or the number of dimensions of the argument.

2. The method of claim 1 further comprising: instructing the compiler to handle the argument as a constant.

3. The method of claim 2, wherein the target language code compiled from the source code is free of an argument corresponding to the argument in the callable compilable unit of code.

4. The method of claim 2 further comprising: passing one or more parameters to the compiler to identify a value of the constant.

5. The method of claim 1 further comprising: defining an attribute class for the argument.

6. The method of claim 5 further comprising:
instantiating an attribute object of the attribute class.

7. The method of claim 6, wherein the passing information comprises:
passing the attribute object to the compiler to provide the compiler with one or more properties of the argument.

8. The method of claim 1, wherein the source code is free of any of declarations or assertions representative of the attribute of the argument.

9. The method of claim 1 further comprising: instructing the compiler to handle the argument as a dynamically typed argument.

10. The method of claim 1, wherein the information about the attribute of the argument comprises an assertion.

11. The method of claim 1, wherein the information about the attribute of the argument comprises a data type attribute representative of a data type of the argument.

12. A non-transitory computer readable medium storing computer executable instructions, the instructions comprising:
one or more instructions that, when executed by a processor, cause the processor to:
call a compiler to compile a callable unit of code into a target language to produce target language code, the calling comprising:
passing information to the compiler about an attribute of an argument of the callable compilable unit of code expressed in source code, wherein:
the source code is free of the passed information, and
the attribute is selected from a group consisting of a numeric data type of the argument, a complexity of the argument, and a number of dimensions of the argument of the callable compilable unit of code, and
the passing information comprises one of:
passing an example of the argument to the compiler and inferring, using the compiler, at least one of the numeric data type of the argument, the complexity of the argument, or the number of dimensions of the argument from the example of the argument, or
passing an object holding the information about the attribute of the argument to the compiler and retrieving, using the compiler, at least one of the numeric data type of the argument, the complexity of the argument, or the number of dimensions of the argument from the object; and
interpret the argument, using the target language code, interprets the argument based on the numeric data type of the argument, the complexity of the argument, or the number of dimensions of the argument.

13. The non-transitory computer readable medium of claim 12, further storing instructions for instructing the compiler to handle the argument of the callable compilable unit of code as a constant.

14. The non-transitory computer readable medium of claim 13, wherein after compiling the source code, the target language code is free of a target language argument corresponding to the argument in the callable compilable unit of code.

15. The non-transitory computer readable medium of claim 13, further storing instructions for passing one or more parameters to the compiler to identify a value of the constant.

16. The non-transitory computer readable medium of claim 12, wherein the source code is free of any of declarations or assertions representative of the attribute of the argument of the callable compilable unit of code.

17. The non-transitory computer readable medium of claim 12, further storing instructions for instructing the compiler to handle the argument of the callable compilable unit of code as a dynamically typed argument.

18. The non-transitory computer readable medium of claim 12, wherein the information about the attribute of the argument of the callable compilable unit of code comprises an assertion.

19. A computing device for use in compiling code, the computing device comprising:
a non-transitory storage device holding source code; and
a processor programmed to provide a compiler, the compiler:
accepting, as input, the source code and as part of a call to the compiler information identifying an attribute of an argument in a callable compilable unit of code in the source code, and
generating, as output, target language code in a target language,
wherein:
the source code is free of the information identifying the attribute of the argument,
the attribute is selected from the group consisting of a numeric data type of the argument, a complexity of the argument, and a number of dimensions of the argument,
information identifying the attribute of the argument comprises one of:
an example of the argument, wherein the compiler infers, from the example of the argument, at least one of the numeric data type of the argument, the complexity of the argument, or the number of dimensions of the argument, or
an object holding the information about the attribute of the argument, wherein the compiler retrieves, from the object, at least one of the numeric data type of the argument, the complexity of the argument, or the number of dimensions of the argument, and
the processor is further programmed to call the compiler to compile the callable compilable unit of code into the target language to produce the target language code, the target language code interpreting the argument using the numeric data type of the argument, the complexity of the argument, or the number of dimensions of the argument.

20. The computing device of claim 19 further comprising an interface responsive to input from a user to call the compiler and input the information identifying the attribute of the argument in the callable compilable unit of code.

21. The computing device of claim 20 further comprising an input device for use by the user to provide the input from the user.

22. The computing device of claim 19 further comprising a display device for use in displaying any of the interface, the callable compilable unit of code, or a representation of the code in the target language.

23. The computing device of claim 19, wherein the callable compilable unit of code comprises one of a text based code or a graphical model based code.

24. The computing device of claim 19, wherein the target language comprises one of a text based target language or a graphical model based target language.

25. A computer-implemented method of compiling source code, the method comprising:
  parsing a polymorphic function written in source code, the polymorphic function having a dynamically typed argument; and
  compiling the source code to translate the polymorphic function into a reduced polymorphic function in a target language using a compiler,
  wherein:
    an argument of the reduced polymorphic function corresponding to the dynamically typed argument has at least one static attribute,
    the compiling comprises compiling two or more versions of the target language based on different attributes of the argument of the reduced polymorphic function, and
    the compiler infers at least one of a numeric data type of the argument of the reduced polymorphic function, a complexity of the argument of the reduced polymorphic function, or a number of dimensions of the argument of the reduced polymorphic function from an example of the argument of the reduced polymorphic function, an assertion, or an instance of an object.

26. A non-transitory computer readable medium storing computer readable instructions, the instructions comprising:
  one or more instructions that, when executed by a processor, cause the processor to:
    call a compiler to compile source code;
    parse a polymorphic function in the source code, the polymorphic function having a dynamically typed argument; and
    compile the source code to translate the polymorphic function into a reduced polymorphic function in a target language using a compiler,
  wherein:
    an argument of the reduced polymorphic function has a static attribute and a dynamic attribute,
    the compiling comprises compiling two or more versions of the target language based on different attributes of the argument of the reduced polymorphic function, and
    the compiler infers at least one of a numeric data type of the argument of the reduced polymorphic function, a complexity of the argument of the reduced polymorphic function, or a number of dimensions of the argument of the reduced polymorphic function from an example of the argument of the reduced polymorphic function, an assertion, or an instance of an object.

\* \* \* \* \*

UNITED STATES PATENT AND TRADEMARK OFFICE
CERTIFICATE OF CORRECTION

PATENT NO. : 8,843,906 B1
APPLICATION NO. : 11/581965
DATED : September 23, 2014
INVENTOR(S) : Martin Clark et al.

Page 1 of 1

It is certified that error appears in the above-identified patent and that said Letters Patent is hereby corrected as shown below:

In The Claims

Column 14, line 46 (in Claim 19), insert --the-- before "information"

Signed and Sealed this
Tenth Day of February, 2015

Michelle K. Lee
*Deputy Director of the United States Patent and Trademark Office*